United States Patent
Yu et al.

(10) Patent No.: US 8,941,065 B2
(45) Date of Patent: Jan. 27, 2015

(54) SPACE PERCEPTION DEVICE

(75) Inventors: Han Young Yu, Daejeon (KR); Yark Yeon Kim, Daejeon (KR); Yong Ju Yun, Daejeon (KR); Won Ick Jang, Daejeon (KR); Eun-ju Jeong, Daejeon (KR); Changho Han, Daegu (KR)

(73) Assignee: Electronics and Telecommunicatons Research Institute, Daejeon (KR)

( * ) Notice: Subject to any disclaimer, the term of this patent is extended or adjusted under 35 U.S.C. 154(b) by 200 days.

(21) Appl. No.: 13/620,245

(22) Filed: Sep. 14, 2012

(65) Prior Publication Data

US 2013/0162463 A1   Jun. 27, 2013

(30) Foreign Application Priority Data

Dec. 23, 2011 (KR) .......................... 10-2011-0141152

(51) Int. Cl.
*A61H 3/06* (2006.01)
(52) U.S. Cl.
USPC ....................................................... 250/341.1
(58) Field of Classification Search
CPC ..... A61H 3/06; A61H 3/061; A61H 2003/06; A61H 2003/061; A61H 2003/063
USPC ........................................................ 250/341.1
See application file for complete search history.

(56) References Cited

U.S. PATENT DOCUMENTS

| 4,858,125 | A | * | 8/1989 | Washizuka et al. | ........... 600/301 |
| 5,973,618 | A | * | 10/1999 | Ellis | .............................. 340/990 |
| 6,710,706 | B1 | * | 3/2004 | Withington et al. | ........ 340/407.1 |
| 7,706,212 | B1 | * | 4/2010 | Campbell | ...................... 367/116 |

FOREIGN PATENT DOCUMENTS

| KR | 2000-0055295 A | 9/2000 |
| KR | 10-2009-0020857 A | 2/2009 |
| KR | 10-2010-0019118 A | 2/2010 |

\* cited by examiner

*Primary Examiner* — Constantine Hannaher (57) ABSTRACT

Disclosed is a space perception device which includes a transceiver unit transmitting and receiving a signal; a processing unit analyzing signals transmitted and received through the transceiver unit to search location information of an obstacle at a space; and a vibration unit providing a user with location information of an obstacle at a space in response to a control of the processing unit. The vibration unit includes a plurality of vibrators having different three-dimensional coordinates.

14 Claims, 6 Drawing Sheets

SPACE PERCEPTION DEVICE

CROSS-REFERENCE TO RELATED APPLICATIONS

A claim for priority under 35 U.S.C. §119 is made to Korean Patent Application No. 10-2011-0141152 filed Dec. 23, 2011, in the Korean Intellectual Property Office, the entire contents of which are hereby incorporated by reference.

BACKGROUND

The inventive concepts described herein relate to a space perception device.

A space perception device may be developed to help a walk of a person who is visually impaired. That is, while the blind walks, the space perception device may search obstacles to provide searched information to the blind. For example, the space perception device may be formed of an infrared sensor and a voice information device. When the blind gets out of a footpath for the blind where a guidance path for infrared radiation is installed, the space perception device may provide the blind with information, informing that the blind gets out of the footpath, through a voice signal. However, the space perception device may be applied only to the footpath for the blind.

SUMMARY

One aspect of embodiments of the inventive concept is directed to provide a space perception device which comprises a transceiver unit transmitting and receiving a signal; a processing unit analyzing signals transmitted and received through the transceiver unit to search location information of an obstacle at a space; and a vibration unit providing a user with location information of an obstacle at a space in response to a control of the processing unit, wherein the vibration unit includes a plurality of vibrators having different three-dimensional coordinates.

In example embodiments, the processing unit comprises a signal analyzing unit analyzing signals transmitted and received through the transceiver unit; and a coordinate determining unit determining a three-dimensional coordinate on a location of an obstacle at a space, based on an analyzed result of the signal analyzing unit.

In example embodiments, the space perception device further comprises a control unit controlling the coordinate determining unit, wherein the control unit selects at least one of the plurality of vibrators by comparing a three-dimensional coordinate of the obstacle determined at the coordinate determining unit and three-dimensional coordinates of the plurality of vibrators.

In example embodiments, the control unit varies a coordinate axis of the three-dimensional coordinate.

In example embodiments, the plurality of vibrators provides a user with location information of an obstacle at a space through vibration.

In example embodiments, the plurality of vibrators is formed of a piezoelectric element.

In example embodiments, the transceiver unit transmits at least two transmission signals in different directions, and the at least two transmission signals transmitted in different directions have different modulation values.

In example embodiments, the transceiver unit selectively receives signals corresponding to the at least two transmission signals transmitted in different directions according to a modulation value.

In example embodiments, the transceiver unit includes an array of transmitters and receivers to transmit at least two transmission signals in different directions and to receive at least two transmission signals from different directions.

In example embodiments, the transceiver unit includes first to third transceivers configured to be directed in different directions.

In example embodiments, the first to third transceivers include first to third image collectors collecting images with respect to different directions, respectively.

In example embodiments, the first to third image collectors measure focal distances on different images on the basis of an infrared ray.

In example embodiments, when the first to third collectors collects the same image, the same images collected by the first to third collectors have different focal distances.

In example embodiments, the space perception device further comprises a stick unit searching information associated with an obstacle on a footpath of a user.

In example embodiments, the plurality of vibrators is configured to include a sensor measuring a function of the human body.

In example embodiments, the processing unit includes a GPS device detecting information about a location of a user.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
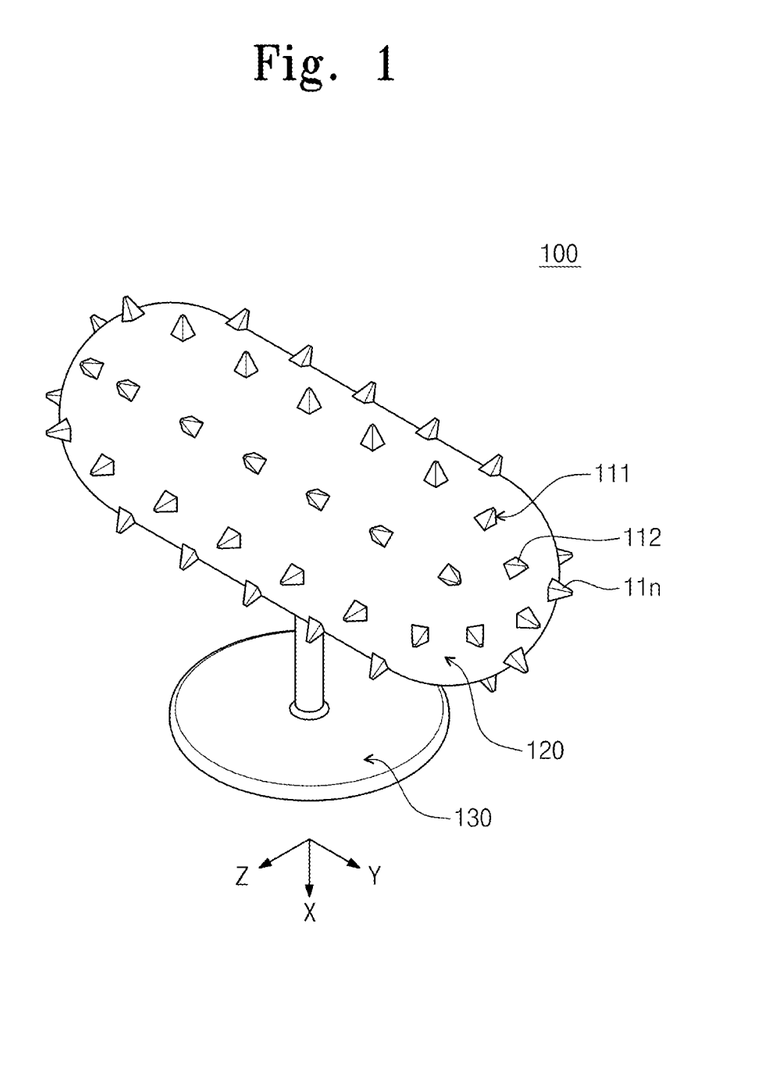
FIG. 1 is a diagram illustrating a space perception device according to an embodiment of the inventive concept.

FIG. 1 is a diagram illustrating a space perception device according to an embodiment of the inventive concept. A space perception device 100 may be configured to search an obstacle at a three-dimensional space using a time difference between a transmission signal and a reception signal and to provide a user with obstacle information through vibrators having different three-dimensional coordinates.

Referring to FIG. 1, the space perception device 100 may include a plurality of vibrators 111 to 11$n$, a processing unit 120, and a transceiver unit 130. A surface of the space perception device 100 may be formed to have a round shape easily taken by hands. For example, the surface of the space perception device 100 may be designed by a customized type to be suitable for a hand's bend of a specific person.

The vibrators 111 to 11$n$ may be distributed on the surface of the space perception device 100 so as to be spaced apart from one another. In this case, the vibrators 111 to 11$n$ may be disposed to different three-dimensional (3D) coordinates, respectively. The vibrators 111 to 11$n$ may provide a user with information obstacles at a 3D space through vibration, for example. Alternatively, the vibrators 111 to 11$n$ may be formed of piezoelectric elements, and may provide a user with information obstacles at a 3D space through an up-and-down motion.

The processing unit 120 may be placed within the space perception device 100. The processing unit 120 may analyze a transmission signal and a reception signal to measure information about an obstacle at a 3D space according to an analyzing result. In this case, information measured by the processing unit 120 may include location information, size information, and shape information of the obstacle.

The transceiver unit 130 may transmit a transmission signal to the outside and receive a reception signal from the outside. Herein, the transmission signal may be an electromagnetic wave transmitted to the outside through the transceiver unit 130, and the reception signal may be a reflected wave that is reflected from an obstacle at a 3D space.

A transmission signal sent from the transceiver unit 130 can be modulated. For example, transmission signals sent from the transceiver unit 130 can be transmitted in different directions, and transmission signals having different directions can be modulated differently.

In the event that a reception signal is input, the transceiver unit 130 may selectively receive a reception signal having selected modulation. Also, the transceiver unit 130 may analyze modulation of an input reception signal. The transceiver unit 130 may easily detect a space by sensing whether a reception signal is input from any direction.

The transceiver unit 130 may include an array of transceivers (not shown) that are configured to transmit transmission signals in various directions and to receive reception signals from various directions.

As illustrated in FIG. 1, the space perception device 100 may have a shape easily taken by a hand, and may search information associated with an obstacle at a 3D space by analyzing transmission and reception signals. Also, the space perception device 100 may provide a user with information about an obstacle through the vibrators 111 to 11$n$. Thus, the user may easily carry the space perception device 100. Also, the user may easily sense information about location, size, and shape of an obstacle through a touch of a hand by using vibrators 111 to 11$n$ of the space perception device 100.

Figure 2:
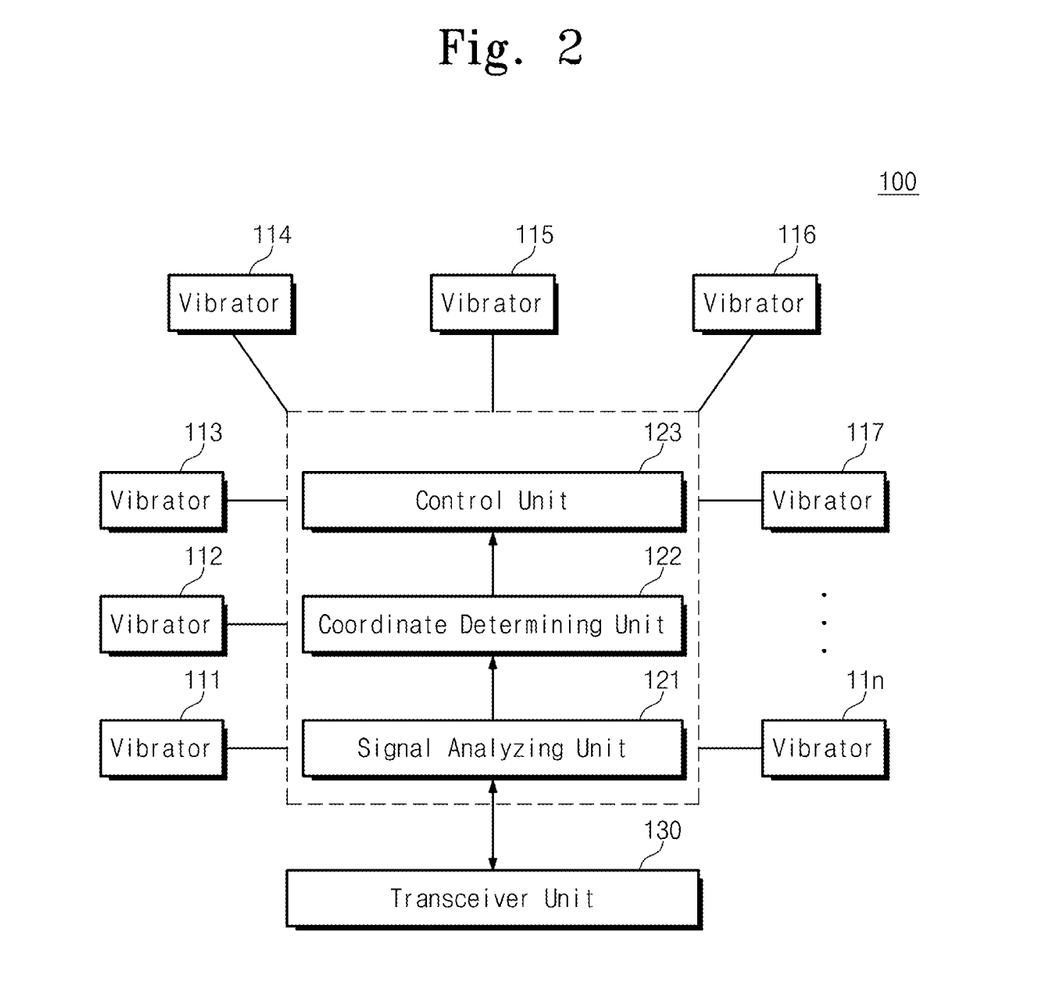
FIG. 2 is a detailed block diagram illustrating a space perception device in FIG. 1.

FIG. 2 is a detailed block diagram illustrating a space perception device in FIG. 1. Referring to FIG. 2, a space perception device 100 may include a plurality of vibrators 111 to 11$n$, a processing unit 120, and a transceiver unit 130.

The processing unit 120 may include a signal analyzing unit 121, a coordinate determining unit 122, and a control unit 123.

The vibrators 111 to 11$n$ may have different 3D coordinates. The vibrators 111 to 11$n$ may provide a user with information of an obstacle at a 3D space through a vibration or up-and-down motion. A set of the vibrators 111 to 11n may be referred to as a vibration unit, and may be disposed variously according to a designer. For example, the vibrators 111 to 11n may be densely disposed at a location where the chance that they are touched directly by a hand is high. This may enable the user to sense 3D space information in detail.

The signal analyzing unit 121 may be provided with information about transmission and reception signals from the transceiver unit 130. The signal analyzing unit 121 may analyze transmission and reception signals to search information associated with location, size, and shape of an obstacle at a 3D space according to the analyzed result. For example, the signal analyzing unit 121 may search obstacle information based on a time difference between transmission and reception signals. Alternatively, the signal analyzing unit 121 may search obstacle information based on a direction of a transmission signal and a direction of a reception signal.

The coordinate determining unit 122 may be provided with obstacle information from the signal analyzing unit 121. The coordinate determining unit 122 may determine the 3D coordinates about an obstacle based on the input information. For example, the coordinate determining unit 122 may determine x-axis, y-axis, and z-axis coordinates associated with an obstacle position, based on obstacle information transferred from the signal analyzing unit 121.

The control unit 123 may be provided with coordinate information associated with an obstacle from the coordinate determining unit 122. The control unit 123 may control the vibrators 111 to 11n such that a vibrator corresponding to an input coordinate operates. For example, in the event that a 3D coordinate of an obstacle corresponds to a coordinate of a first vibrator 111, the control unit 123 may control the first vibrator 111 to be vibrated.

In FIGS. 1 and 2, a coordinate axis determining a 3D coordinate of the vibrators 111 to 11n and a 3D coordinate of an obstacle may be determined on the basis of the transceiver 130. That is, an x-axis direction, a y-axis direction, and a z-axis direction may be determined on the basis of the transceiver 130. For example, as illustrated in FIG. 1, the x-axis direction may be a length direction of the transceiver 130, and the y-axis and z-axis directions may be perpendicular to the length direction of the transceiver 130.

In this case, the 3D coordinate (i.e., x-axis coordinate, y-axis coordinate, and z-axis coordinate) of each vibrator may be determined along an x-axis, a y-axis, and a z-axis. Thus, when a location of an obstacle at a 3D space is measured, a vibrator corresponding to the measured location may be selected. Alternatively, the control unit 123 may arbitrarily adjust a coordinate axis according to a motion of a user's hand such that the 3D coordinate of each vibrator is reestablished.

Figure 3:
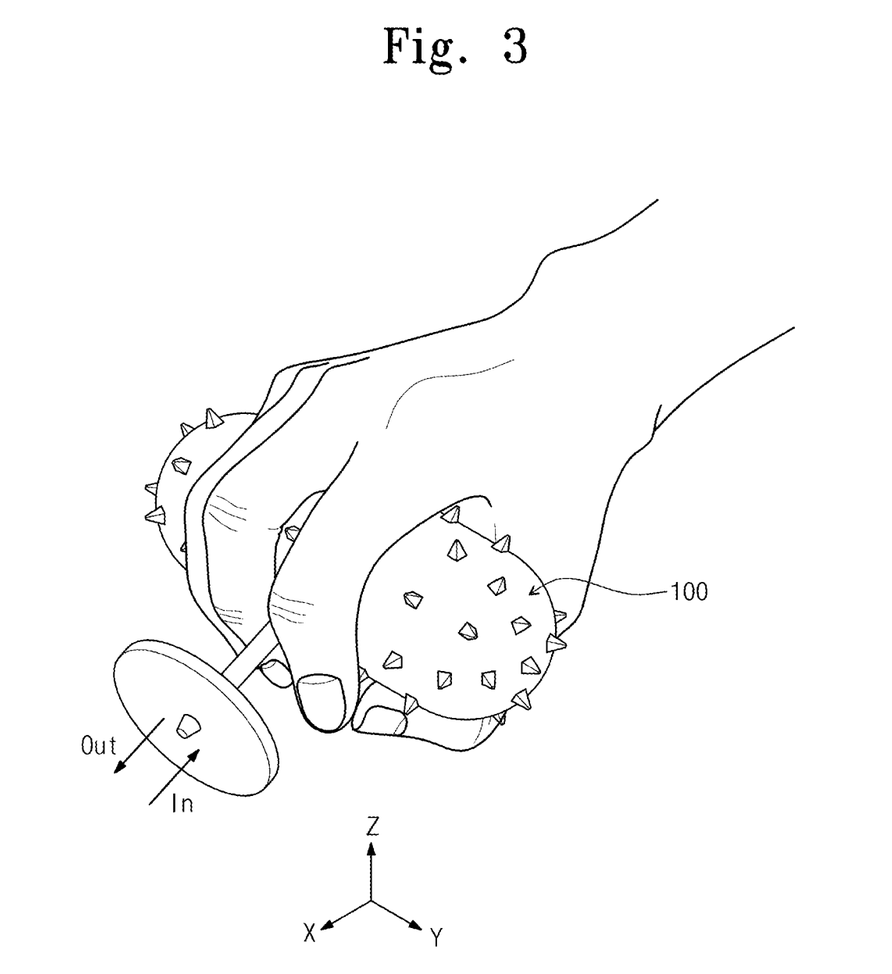
FIG. 3 is a diagram illustrating an example that a user directly carries a space perception device in FIGS. 1 and 2.

FIG. 3 is a diagram illustrating an example that a user directly carries a space perception device in FIGS. 1 and 2. As illustrated in FIG. 3, a user may easily carry a space perception device 100, and may feel information associated with an obstacle at a 3D space through a plurality of vibrators in three dimensions.

As described with reference to FIGS. 1 to 3, the space perception device 100 may be easily carried, and may provide a user with information about an obstacle at a 3D space. However, the inventive concept is not limited thereto. Below, applications of the inventive concept will be more fully described.

Figure 4:
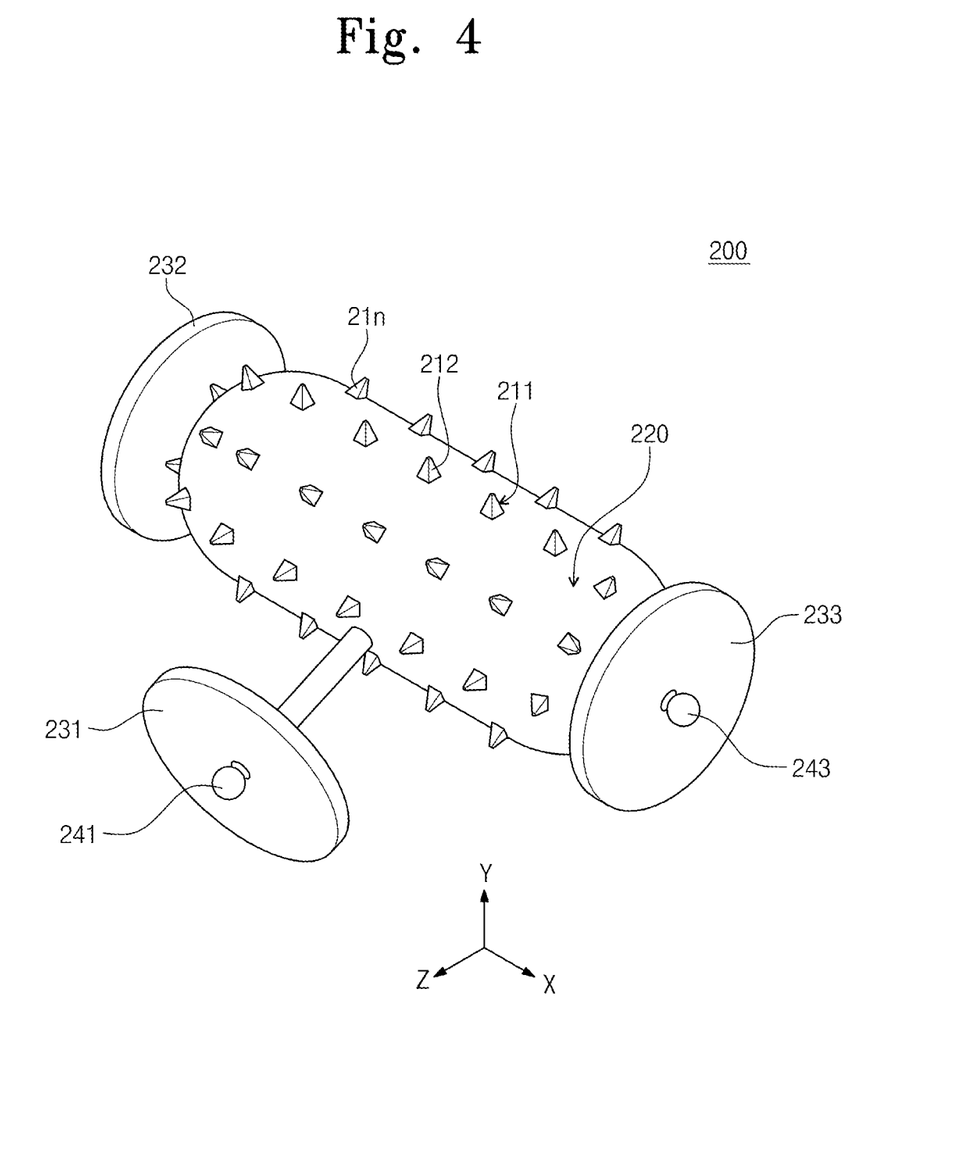
FIG. 4 is a diagram illustrating a space perception device according to another embodiment of the inventive concept.

FIG. 4 is a diagram illustrating a space perception device according to another embodiment of the inventive concept. A space perception device 200 in FIG. 4 may be similar to that described with reference to FIGS. 1 to 3. Similar elements may be marked by similar reference numerals, and description thereof is thus omitted.

Referring to FIG. 4, the space perception device 200 may include a plurality of vibrators 211 to 21n, a processing unit 220, and first to third transceiver units 231 to 233. Image collectors 241 to 243 may be mounted at the first to third transceiver units 231 to 233, respectively.

Unlike a space perception device 100 described with reference to FIGS. 1 to 3, the space perception device 200 in FIG. 4 may include three transceiver units 231 to 233. That is, the space perception device 200 may transmit and receive a signal in three directions via the three transceiver units 231 to 233. Thus, it is possible to search obstacle information at a 3D space.

With the space perception device 200 in FIG. 4, the transceiver units 231 to 233 may be disposed in three dimensions to transmit a signal in three directions and receive a signal from three directions. Thus, the space perception device 200 in FIG. 4 may detect a region which is not detected by the space perception device 100 described with reference to FIGS. 1 to 3.

For example, the space perception device 200 may measure a location of an obstacle and a distance between the space perception device 200 and the obstacle using interference of signals measured at three directions and a time of flight of signals. The reason may be that interference of signals input is generated due to a time difference between input times of reflected signals and such signal interference is converted into a signal having distance information. This may enable 3D space perception in addition to an arrayed transceiver unit 130 of a space perception device 100 in FIGS. 1 to 3. Thus, it is possible to secure high signal and space perception capacities.

The space perception device 200 in FIG. 4 may include the first to third image collectors 241 to 243, which are mounted at the first to third transceiver units 231 to 233. The first to third image collectors 241 to 243 may detect a space through a time flow of images from among collected images other than intersecting images.

That is, the processing unit 220 may obtain obstacle information at a 3D space using images collected by the first to third image collectors 241 to 243. Information associated with an obstacle at a 3D space may be provided to a user through the plurality of vibrators 221 to 21n. Thus, the space perception device 200 may search information associated with a 3D space in detail by measuring obstacle information at a 3D space through analysis of transmission and reception signals and by additionally acquiring information associated with an obstacle at a 3D space through image collection.

Further, the first to third image collectors 241 to 243 may discriminate a distance in infrared lays for image collection to focus. In this case, focusing devices (e.g., infrared devices) may be installed at the first to third image collectors 241 to 243, respectively. Thus, the first to third image collectors 241 to 243 may measure an image focal distance, respectively.

In the event that the first to third image collectors 241 to 243 collect the same image, the same images collected by the first to third image collectors 241 to 243 may have different focal distances. The different focal distances may enable the space perception device 200 to exactly measure distances on obstacles and structures disposed at a space.

Figure 5:
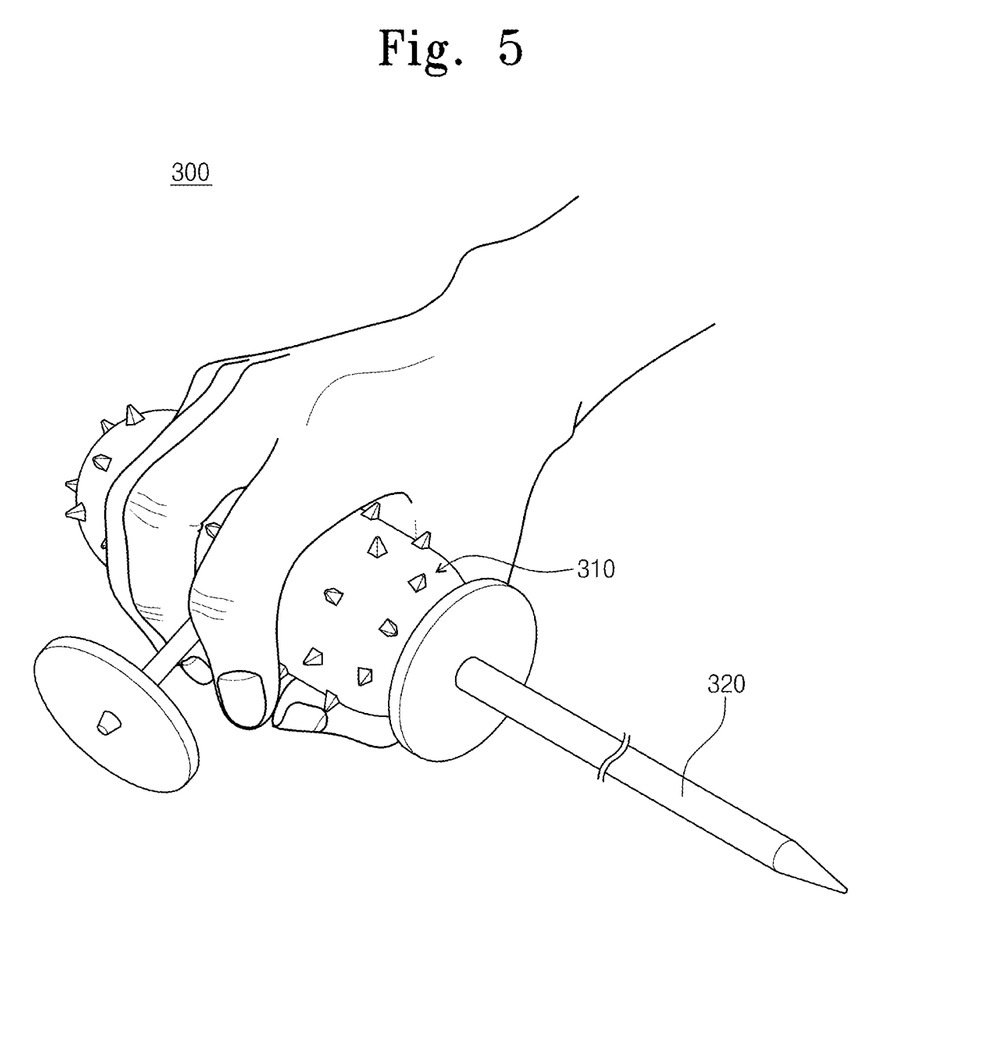
FIG. 5 is a diagram illustrating a space perception device according to still another embodiment of the inventive concept.

FIG. 5 is a diagram illustrating a space perception device according to still another embodiment of the inventive concept. A space perception device 300 in FIG. 5 may be similar to that in FIGS. 1 to 3. Thus, a difference between the space perception devices 100 and 300 may be mainly described.

Referring to FIG. 5, a space perception device 300 may include a body unit 310 and a stick unit 320. The body unit 310 may be configured substantially the same as that described with reference to FIGS. 1 to 3. That is, the space perception device 300 in FIG. 5 may have such a structure that both a space perception device 100 in FIGS. 1 to 3 and a stick for the blind are joined.

In the event that curve and depth of a footpath are varied, a user may sense a state of the footpath through the stick unit 320 of the space perception device 300. In addition, the user may be provided with information about an obstacle at a 3D space from the body unit 310 of the space perception device 300. Thus, the user may sense an obstacle on a foot path through the stick unit 320 and an obstacle at a 3D space where the user walks. Further, the stick unit 320 may be used as a coordinate axis for measuring 3D coordinates at the body unit 310.

Figure 6:
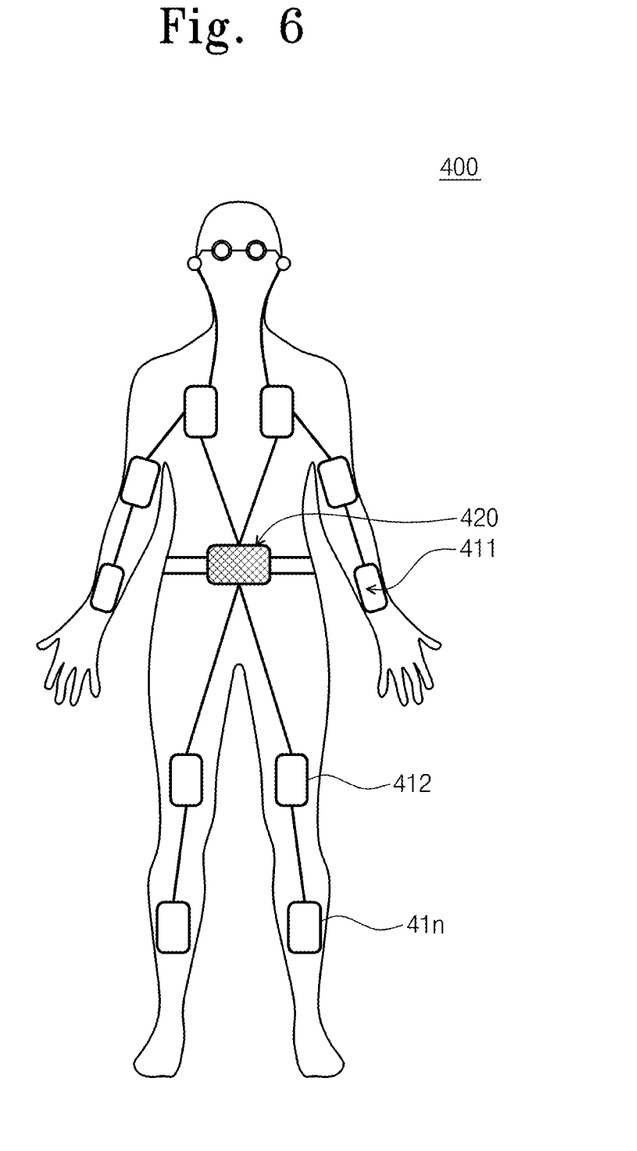
FIG. 6 is a diagram illustrating a space perception device according to still another embodiment of the inventive concept.

FIG. 6 is a diagram illustrating a space perception device according to still another embodiment of the inventive concept. Referring to FIG. 6, a space perception device 400 may include a plurality of vibrators 411 to 41n and a processing unit 420.

The vibrators 411 to 41n may operate as a sensor. That is, the vibrators 411 to 41n may be implemented such that vibrators 111 and 112 in FIG. 1 and a transceiver unit 130 in FIG. 1 are united. In this case, the vibrators 411 to 41n may simultaneously sense a 3D space at many points.

The vibrators 411 to 41n may be implemented by a patch shape such that they are attached to a part of the human body. Alternatively, the vibrators 411 to 41n may be implemented by a band or brooch shape such that they are worn on clothing of the user. The vibrators 411 to 41n may provide the user with information associated with an obstacle at a 3D space under the control of the processing unit 420. For example, in the event that an obstacle at a 3D space is located at a left wrist of the user on the basis of a walking direction of a walker, a vibrator attached at the left wrist may inform the user of a location of the obstacle through vibration.

The vibrators 411 to 41n may be implemented to include a sensor sensing a function of the human body. For example, the vibrators 411 to 41n may be united with a sensor that senses functions of the human body such as heart rate, oxygen saturation, blood sugar level, body heat, moisture, sweat level, salt, PH, and the like.

The processing unit 420 may measure information associated with an obstacle at a 3D space from the vibrators 411 to 41n operating as sensors, and may control vibration of the vibrators 411 to 41n based on the measured result. The processing unit 420 may include a location information receiving device such as GPS capable of detecting a location of the user, and may provide the user with information associated with a location of the user. Further, the processing unit 420 may be configured to include a transmitter which transmits information associated with a location of the user and functions of the human body to a personal computer of the user.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A space perception device comprising:
    a transceiver unit transmitting and receiving a signal, the transceiver unit including first, second, and third transceivers;
    an elongated body with a long axis;
    a processing unit analyzing signals transmitted and received through the transceiver unit to search location information of an obstacle at a space; and
    a vibration unit providing a user with location information of an obstacle at a space in response to a control of the processing unit,
        wherein the first transceiver is oriented in a first direction parallel to the long axis,
        wherein the second transceiver is oriented in a second direction opposite to the first direction,
        wherein the third transceiver is oriented in a third direction orthogonal to the long axis, and
    wherein the vibration unit includes a plurality of vibrators having different three-dimensional coordinates.

2. The space perception device of claim 1, wherein the processing unit comprises:
    a signal analyzing unit analyzing signals transmitted and received through the transceiver unit; and
    a coordinate determining unit determining a three-dimensional coordinate on a location of an obstacle at a space, based on an analyzed result of the signal analyzing unit.

3. The space perception device of claim 2, further comprising:
    a control unit controlling the coordinate determining unit,
        wherein the control unit selects at least one of the plurality of vibrators by comparing a three-dimensional coordinate of the obstacle determined at the coordinate determining unit and three-dimensional coordinates of the plurality of vibrators.

4. The space perception device of claim 3, wherein the control unit varies a coordinate axis of the three-dimensional coordinate.

5. The space perception device of claim 1, wherein the plurality of vibrators provides a user with location information of an obstacle at a space through vibration.

6. The space perception device of claim 1, wherein the plurality of vibrators is formed of a piezoelectric element.

7. The space perception device of claim 1, wherein the transceiver unit transmits at least two transmission signals in different directions, and the at least two transmission signals transmitted in different directions have different modulation values.

8. The space perception device of claim 7, wherein the transceiver unit selectively receives signals corresponding to the at least two transmission signals transmitted in different directions according to a modulation value.

9. The space perception device of claim 1, wherein the first to third transceivers include first to third image collectors collecting images with respect to different directions, respectively.

10. The space perception device of claim 9, wherein the first to third image collectors measure focal distances on different images on the basis of an infrared ray.

11. The space perception device of claim 10, wherein when the first to third collectors collects the same image, the same images collected by the first to third collectors have different focal distances.

12. The space perception device of claim 1, further comprising:
    a stick unit searching information associated with an obstacle on a footpath of a user.

13. The space perception device of claim 1, wherein the plurality of vibrators is configured to include a sensor measuring a function of the human body.

14. The space perception device of claim 1, wherein the processing unit includes a GPS device detecting information about a location of a user.

\* \* \* \* \*